US005239870A

United States Patent [19]

Kaneko

[11] Patent Number: 5,239,870
[45] Date of Patent: Aug. 31, 1993

[54] SEMICONDUCTOR ACCELERATION SENSOR WITH REDUCED CROSS AXIAL SENSITIVITY

[75] Inventor: Hiroyuki Kaneko, Yokohama, Japan
[73] Assignee: Nissan Motor Co., Ltd., Yokohama, Japan
[21] Appl. No.: 763,159
[22] Filed: Sep. 20, 1991
[30] Foreign Application Priority Data
  Sep. 21, 1990 [JP] Japan .................... 2-250363
[51] Int. Cl.⁵ ............................ G01P 15/12
[52] U.S. Cl. ...................... 73/517 R; 338/46
[58] Field of Search .............. 73/517 R, 510; 338/2, 338/5, 46

[56] References Cited

U.S. PATENT DOCUMENTS 4,306,456 12/1981 Maerfeld ................ 73/517 R
4,430,895 2/1984 Colton .................... 73/517 R
4,891,984 1/1990 Fujii et al. ............... 73/517 R Primary Examiner—John E. Chapman
Attorney, Agent, or Firm—Foley & Lardner

[57] ABSTRACT

A semiconductor acceleration sensor with a reduced cross axial sensitivity, which is easily manufacturable. In this semiconductor acceleration sensor, two sensor units are provided on two cantilever beams which have the identical shape and are arranged on the same plane in mutually opposite orientations, and a bridge circuit is formed by the piezoresistors of these two sensor units, such that the cross axial sensitivity of the semiconductor acceleration sensor can be reduced significantly. The bridge circuit to be formed can be a half bridge circuit, or a full bridge circuit in which case the piezoresistors of the second sensor unit are arranged to be oriented along a direction perpendicular to that along which the piezoresistors of the first sensor unit are arranged to be oriented. This semiconductor acceleration sensor can be manufactured monolithically on a single semiconductor substrate, or from separately manufactured acceleration sensors.

8 Claims, 7 Drawing Sheets

SEMICONDUCTOR ACCELERATION SENSOR WITH REDUCED CROSS AXIAL SENSITIVITY

BACKGROUND OF THE INVENTION

1. Field of the Invention

The present invention relates to a semiconductor acceleration sensor which utilizes the piezoresistive effect of piezoresistors formed on a semiconductor substrate.

2. Description of the Background Art

Recently, much attention has been attracted to a small size semiconductor acceleration sensor in which the detection of an acceleration is achieved by detecting a small capacity change or the change of the resistivity caused by the piezoresistive effect of the piezoresistors formed on a semiconductor substrate.

Such a semiconductor acceleration sensor is manufactured by using a circuit integration technique, so that it can be manufactured in the form of a compact chip element of approximately 1 mm×1 mm size, with a vibrator portion having a length approximately equal to 100 μm and a thickness approximately equal to 1 μm. In addition, it is also possible to form this semiconductor acceleration sensor on a substrate commonly shared with the other circuit elements.

Such a semiconductor acceleration sensor has a wide range of applications, among which a typical example is an acceleration sensor for an automobile.

An example of a conventional semiconductor acceleration sensor for an automobile is shown in FIG. 1 and FIG. 2.

In this semiconductor acceleration sensor of FIG. 1 and FIG. 2, there is provided a cantilever beam 2 having a weight portion 3 on its free end and a piezoresistor 5 in the vicinity of its fixed end. This cantilever beam 2 is arranged in a space 10 formed on a frame 4 such that the weight portion can freely vibrate between a lower stopper 7 for limiting a downward displacement of the weight portion 3 and an upper stopper 8 for limiting an upward displacement of the weight portion 3, with the fixed end of the cantilever beam 2 fixedly attached to the frame 4. In addition, another piezoresistor 6 which is identical to the piezoresistor 5 is formed on the frame 4, so as to form a bridge circuit.

This semiconductor acceleration sensor is to be positioned to have the acceleration applied in a direction perpendicular to the sensor chip, such that the displacement of the cantilever beam 2 caused by the acceleration can be detected as a change in the resistivity of the piezoresistor 5. Here, the possible damaging of the cantilever beam 2 due to the excessive acceleration is prevented by limiting the displacement of the weight portion 3 with the lower and upper stoppers 7 and 8.

Such a semiconductor acceleration sensor can be manufactured by applying an IC manufacturing process to a silicon substrate 1.

However, in manufacturing such a conventional semiconductor acceleration sensor by applying an etching process on a semiconductor substrate from a wafer surface so as to form the cantilever beam 2 and the weight portion 3, there has been a problem that, as shown in FIG. 3, it has been quite difficult to place a center of mass 31 of the weight portion 3 at the same vertical level as the cantilever beam 2, while on the other hand the presence of a vertical deviation δL between the center of mass 31 of the weight portion 3 and the cantilever beam 2 can produce an undesirable cross axial sensitivity in the semiconductor acceleration sensor.

Namely, when the distance between the center of mass 31 of the weight portion 3 and the fixed end of the cantilever beam 2 is L and there is a vertical deviation δL between the center of mass of the weight portion 3 and the cantilever beam 2, the semiconductor acceleration has a cross axial sensitivity $S_{cross} = \delta L/L$.

To cope with this problem, there has been a proposal for additionally providing a metallic weight 41 on top of the weight portion 3 as shown in FIG. 4, so as to bring the center of mass up to the same vertical level as the cantilever beam 2. However, such a configuration will complicate the manufacturing process of the semiconductor acceleration sensor. Moreover, an addition of a member made of a material different from the rest of the semiconductor acceleration sensor presents a very serious problem concerning thermal stress.

On the other hand, there has been another proposal for shaping the semiconductor acceleration sensor as shown in FIG. 5 by applying an etching process on a semiconductor substrate from both sides of a wafer, such that the center of mass of the weight portion can be placed at the same vertical level as the cantilever beam 2. However, such a configuration will also complicate the manufacturing process of the semiconductor acceleration sensor, as the deep etching has to be applied to both sides of the wafer.

Here, for the purpose of manufacturing a silicon cantilever beam with a highly accurate thickness, the etching process may be achieved by the electrochemical etching stop method in which an electrochemical etching is carried out in a solution of a strong alkali such as potassium hydroxide (KOH) or by the etching stop method using a high concentration p-type diffusion layer. However, in such cases, the formation of the epitaxial layer or a high concentration p-type diffusion layer required by these etching process will be quite difficult.

Moreover, with a configuration shown in FIG. 5, it becomes quite difficult to carry out a photolithography for forming the piezoresistors and metallic wirings.

SUMMARY OF THE INVENTION

It is therefore an object of the present invention to provide a semiconductor acceleration sensor with a reduced cross axial sensitivity, which is easily manufacturable.

According to one aspect of the present invention there is provided a semiconductor acceleration sensor, comprising: a frame; a first cantilever beam with its fixed end attached to the frame, having a first weight portion on its free end; first sensor means for detecting an acceleration, formed by piezoresistors provided in a vicinity of the fixed end of the first cantilever beam; a second cantilever beam with its fixed end attached to the frame, having a second weight portion on its free end, the second cantilever beam having an overall shape identical to that of the first cantilever beam, and oriented along a direction opposite to that along which the first cantilever beam is oriented; and second sensor means for detecting an acceleration, formed by piezoresistors provided in a vicinity of the fixed end of the second cantilever beam, the piezoresistors of the second sensor means being connected with the piezoresistors of the first sensor means to form a bridge circuit.

According to another aspect of the present invention there is provided a semiconductor acceleration sensor, comprising: a package substrate having a first base and a second base; a first cantilever beam with its fixed end attached to the first base, having a first weight portion on its free end; first sensor means for detecting an acceleration, formed by piezoresistors provided in a vicinity of the fixed end of the first cantilever beam; a second cantilever beam with its fixed end attached to the second base, having a second weight portion on its free end, the second cantilever beam having an overall shape identical to that of the first cantilever beam, and oriented along a direction opposite to that along which the first cantilever beam is oriented; and second sensor means for detecting an acceleration, formed by piezoresistors provided in a vicinity of the fixed end of the second cantilever beam, the piezoresistors of the second sensor means being connected with the piezoresistors of the first sensor means to form a bridge circuit.

Other features and advantages of the present invention will become apparent from the following description taken in conjunction with the accompanying drawings.

DETAILED DESCRIPTION OF THE PREFERRED EMBODIMENTS

Figure 1:
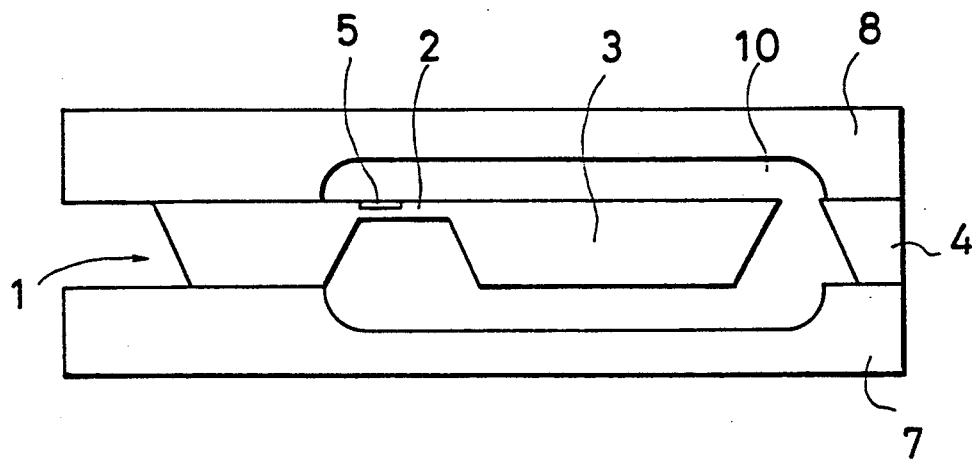
FIG. 1 is a cross sectional view of an example of a conventional semiconductor acceleration sensor for an automobile.
Figure 2:
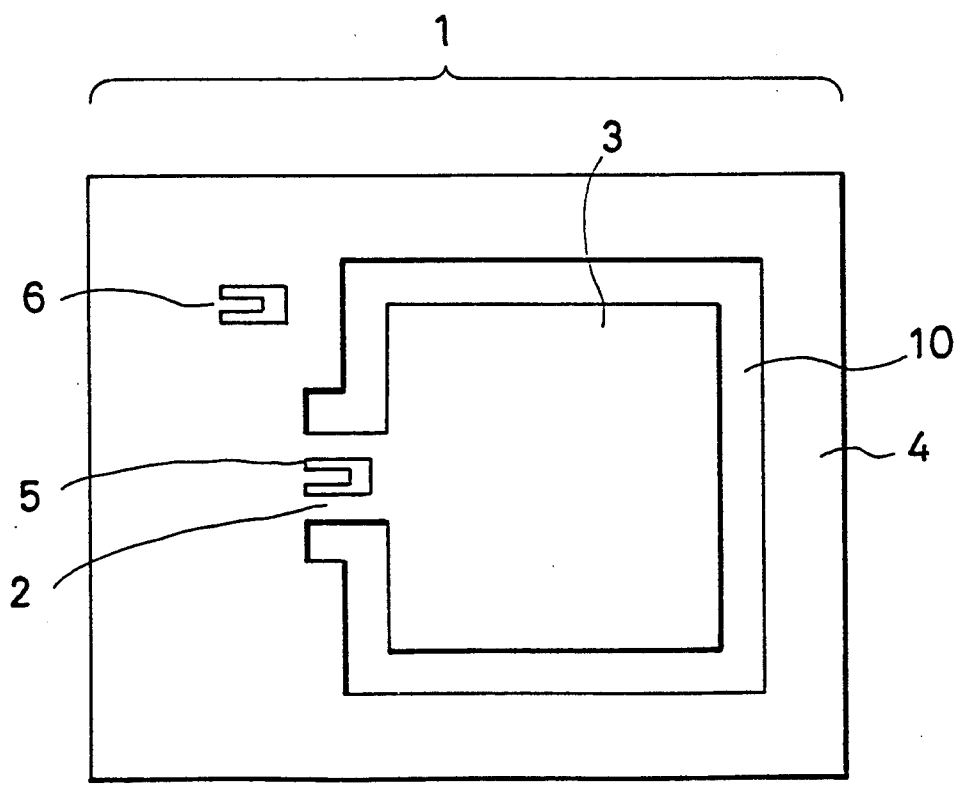
FIG. 2 is a top plan view of the conventional semiconductor acceleration sensor of FIG. 1.
Figure 3:
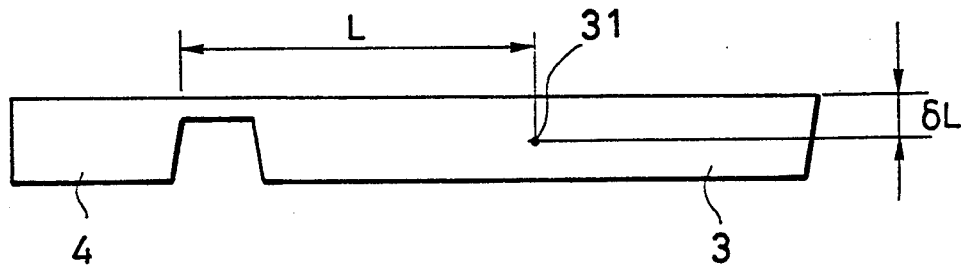
FIG. 3 is a cross sectional view of a central part of the conventional semiconductor acceleration sensor of FIG. 1 and FIG. 2.
Figure 4:
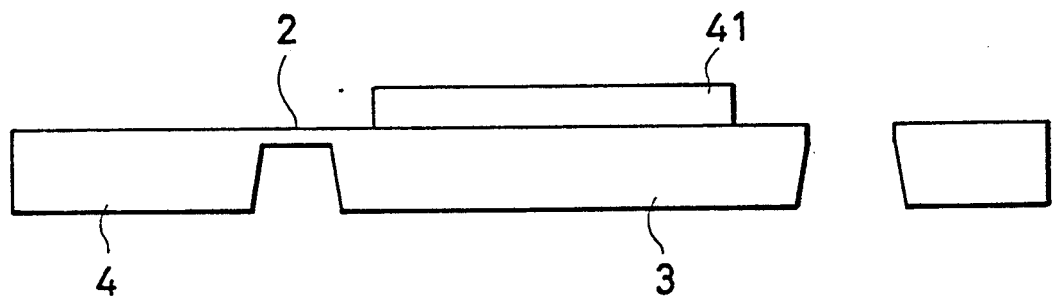
FIG. 4 is a cross sectional view of a central part of a conventional semiconductor acceleration sensor incorporating one possible modification.
Figure 5:
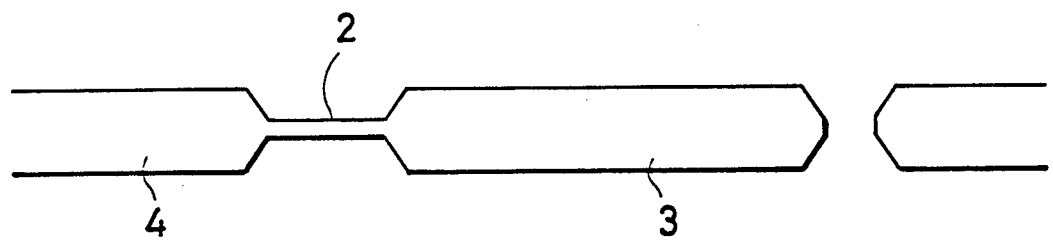
FIG. 5 is a cross sectional view of a central part of a conventional semiconductor acceleration sensor incorporating another possible modification.
Figure 6:
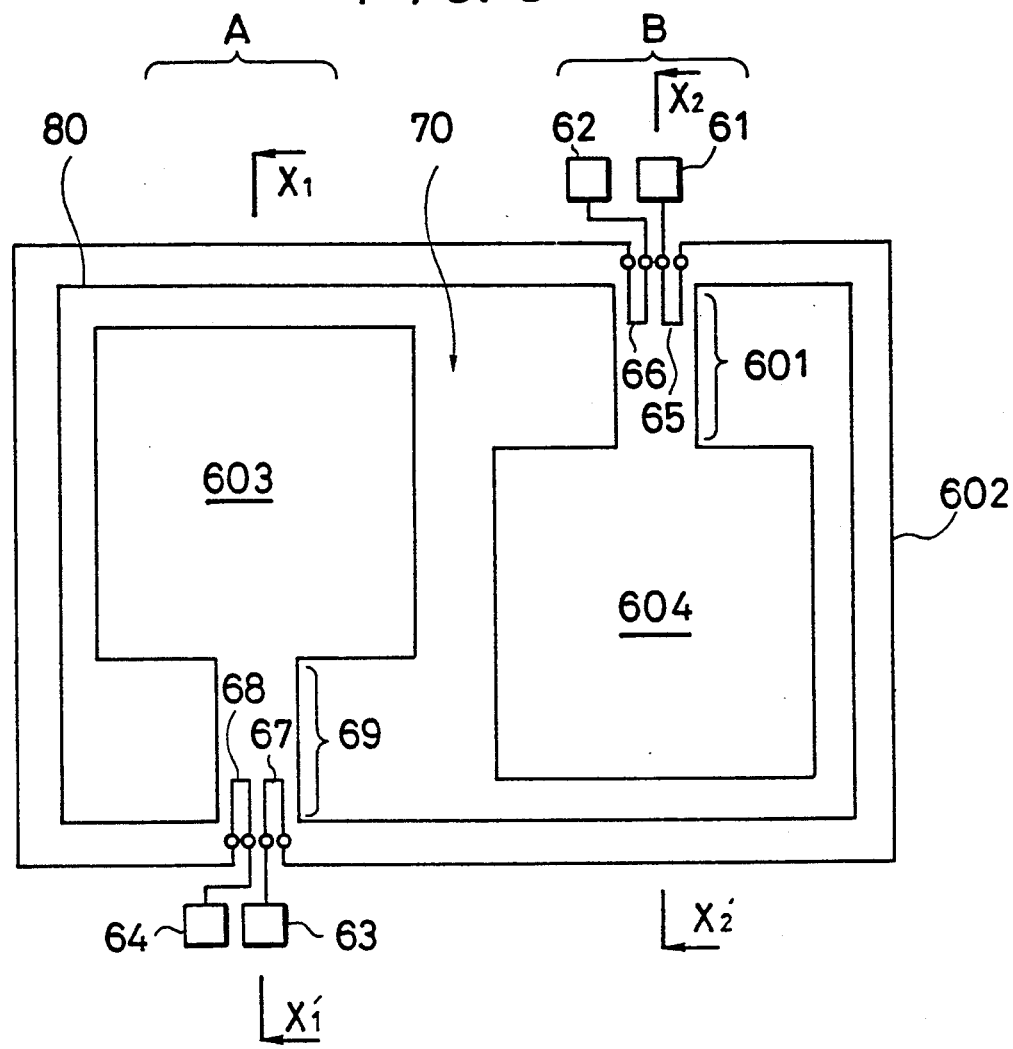
FIG. 6 is a top plan view of a first embodiment of a semiconductor acceleration sensor according to the present invention.

Referring now to FIG. 6, a first embodiment of a semiconductor acceleration sensor according to the present invention will be described in detail.

This semiconductor acceleration sensor of the first embodiment shown in FIG. 6 is manufactured by applying an etching process on a silicon substrate from a lower side of a wafer, and comprises a first cantilever beam 69 having a first weight portion 603 at its free end; a first sensor unit A formed by piezoresistors 67 and 68 formed in a vicinity of a fixed end of the first cantilever beam 69; a second cantilever beam 601 having a second weight portion 604 at its free end; a second sensor unit B formed by piezoresistors 65 and 66 formed in a vicinity of a fixed end of the second cantilever beam 601.

Here, the first cantilever beam 69 and the second cantilever beam 601 have an identical shape and are arranged on the same plane in mutually opposite orientations in a common space 70 formed on a frame 80.

Figure 7:
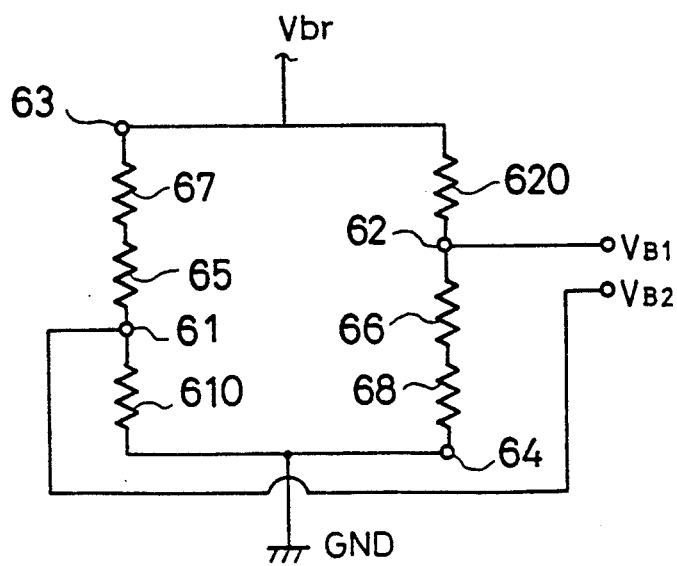
FIG. 7 is a diagram of an equivalent circuit for the semiconductor acceleration sensor of FIG. 6.

Moreover, the piezoresistors 65, 66, 67, and 68 are connected by a wiring 602 provided on the frame 80 such that the piezoresistor 67 of the first sensor unit A and the piezoresistor 65 of the second sensor unit B are connected in series while the piezoresistor 68 of the first sensor unit A and the piezoresistor 66 of the second sensor unit B are connected in series, so as to form a half bridge circuit shown in FIG. 7. In addition, the piezoresistors 65, 66, 67, and 68 are connected with electrodes 61, 62, 63, and 64 provided on the frame 80, respectively, and the bridge circuit configuration of FIG. 7 also includes external resistors 610 and 620. This bridge circuit is applied with a voltage $V_{br}$, and an output voltage of the bridge circuit is obtained as a difference between the voltage $V_{B1}$ at the electrode 62 and the voltage $V_{B2}$ at the electrode 61.

Now, a manufacturing process for this semiconductor acceleration sensor of the first embodiment will be described in detail with reference to FIGS. 8(A) to 8(D).

Figure 8A:
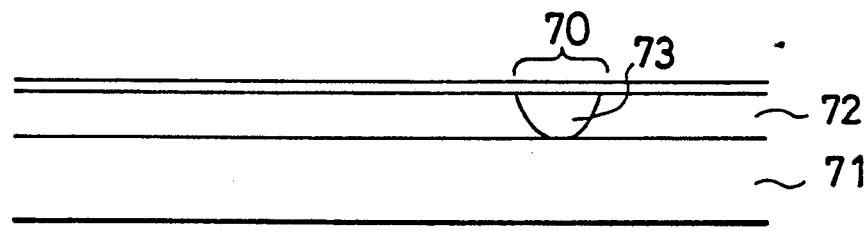
FIGS. 8(A) to 8(D) are sequential views of a manufacturing process of the semiconductor acceleration sensor of FIG. 6.

First, as shown in FIG. 8(A), an n-type epitaxial growth layer 72 is formed on a surface of a p-type silicon substrate 71 by using the epitaxial growth method, and then a p-type diffusion layer 73 is formed in the n-type epitaxial growth layer 72 at a location corresponding to the space 70, where this p-type diffusion layer is to be removed afterwards to form the space 70.

Figure 8B:
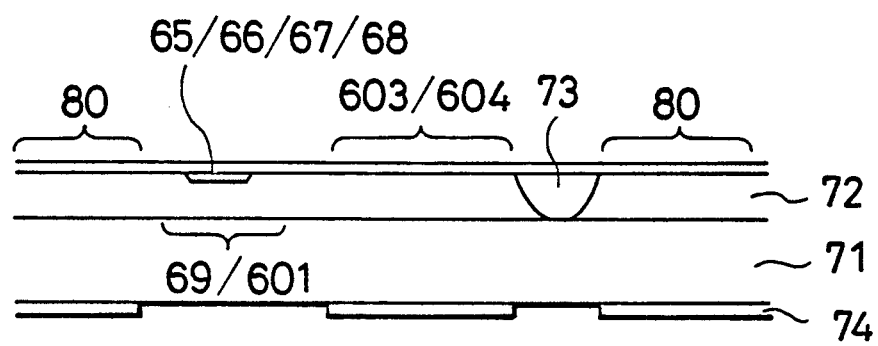

Then, as shown in FIG. 8(B), the piezoresistor 65/66/67/68 is formed on an upper surface of the n-type epitaxial growth layer 72 at a location corresponding to the cantilever beam 69/601 by using the impurity diffusion process, and then etching protection films 74 are formed on a lower surface of the p-type silicon substrate 71 at locations corresponding to the frame 80 and the weight portion 603/604.

Figure 8C:
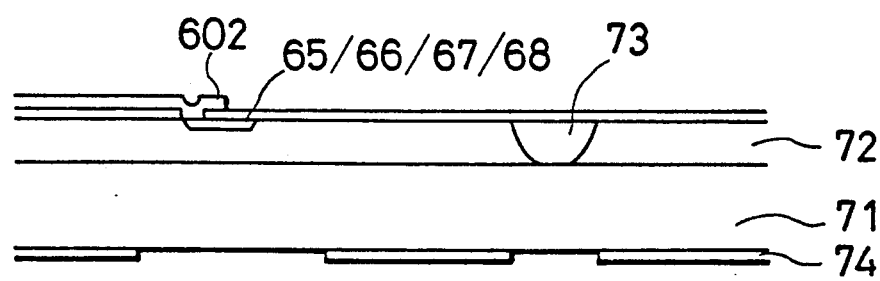

Next, as shown in FIG. 8(C), the wiring 602 made of aluminum is formed on the upper surface of the n-type epitaxial growth layer 72.

Figure 8D:
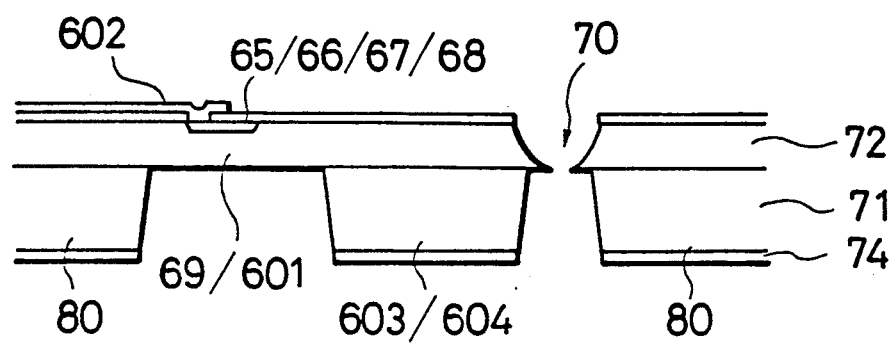

Then, as shown in FIG. 8(D), the cantilever beam 69/601, the weight portion 603/604, and the frame 80 are formed by removing unnecessary parts of the p-type silicon substrate 71 by applying an etching process from a lower side of the wafer in a solution of a strong alkali such as potassium hydroxide (KOH) while applying a positive voltage to the n-type epitaxial growth layer 72.

Figure 9:
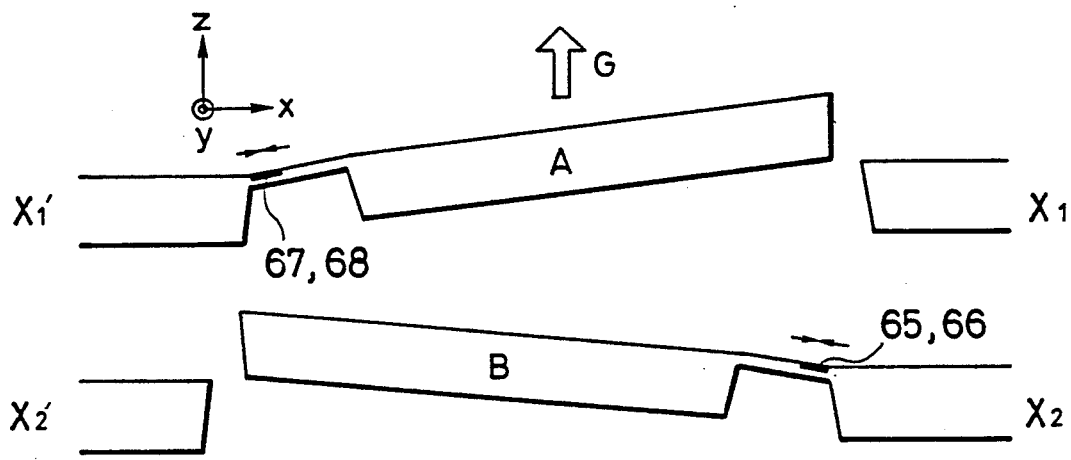
FIG. 9 is a cross sectional view of central parts of the semiconductor acceleration sensor of FIG. 6 in a case of having an acceleration in a normal detection direction.
Figure 10:
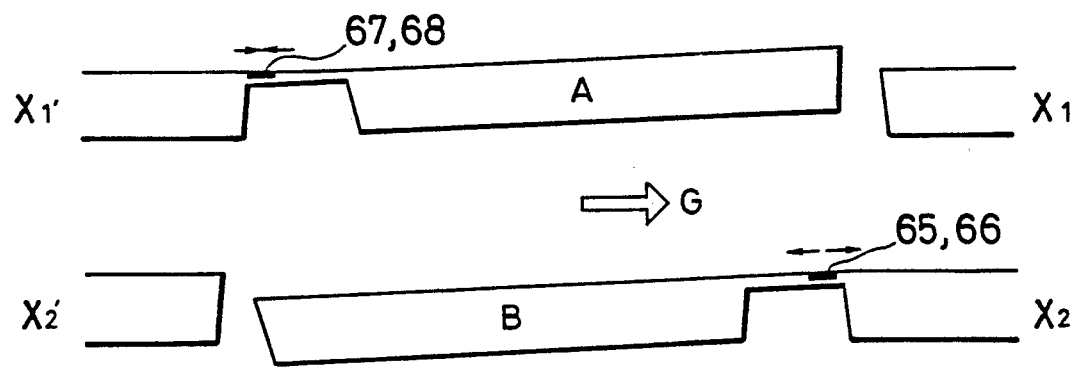
FIG. 10 is a cross sectional view of central parts of the semiconductor acceleration sensor of FIG. 6 in a case of having an acceleration in a non-detection direction.

Now, an operation of this semiconductor acceleration sensor of the first embodiment will be described in detail with reference to FIGS. 9 and 10, each of which shows $X_1$-$X'_1$ cross section and $X_2$-$X'_2$ cross section of the semiconductor acceleration sensor of FIG. 6 together.

First, a case of having an acceleration G applied in a normal detection direction Z shown in FIG. 9 will be described.

In this case, the first weight portion 603 and the second weight portion 604 are displaced in the same direction with respect to the Z-axis, so that the piezoresistors 67 and 68 on the first cantilever beam 69 and the piezoresistors 65 and 66 on the second cantilever beam 601 receive the same stress in the same direction. Here, the piezoresistors 65, 66, 67, and 68 are connected to form a half bridge circuit as shown in FIG. 7, so that an overall output voltage given by:

$$V_{B1} - V_{B2} = (\Delta R/2R) \times V_{br}$$

will be obtained, where R is a resistance of each of the resistors 610 and 620, $\Delta R$ is a change of the piezoresistance due to the application of the acceleration G, and each of the piezoresistors 65, 66, 67, and 68 has a resistance equal to $(\Delta R + R)/2$.

Next, a case of having an acceleration G applied in a non-detection direction X along the direction of the cantilever beams 69 and 601 shown in FIG. 10 will be described.

In this case, the first weight portion 603 and the second weight portion 604 are displaced in the opposite direction with respect to the Z-axis, so that the piezoresistors 67 and 68 on the first cantilever beam 69 and the piezoresistors 65 and 66 on the second cantilever beam 601 receive the same stress in the mutually opposite directions simultaneously.

As a result, the piezoresistance of the piezoresistors 67 and 68 is increased while the piezoresistance of the piezoresistors 65 and 66 is decreased, or vice versa, so that the overall output voltage of the bridge circuit will remain unchanged.

On the other hand, in a case of having an acceleration G applied in another non-detection direction Y perpendicular to the direction of the cantilever beams 69 and 601, the sensitivity of the first and second sensor units A and B in the Y-direction can be made very small by shaping the cantilever beams 69 and 601 to have a thickness much smaller than a width, such that the piezoresistances of the piezoresistors 65, 66, 67, and 68 are hardly changed by the acceleration in the Y-direction.

Thus, according to this first embodiment of the semiconductor acceleration sensor, by arranging two sensor units having an identical shape on the same plane in mutually opposite orientations, and by forming a bridge circuit by the piezoresistors of these two sensor units, the cross axial sensitivity of the semiconductor acceleration sensor can be reduced significantly.

Figure 11:
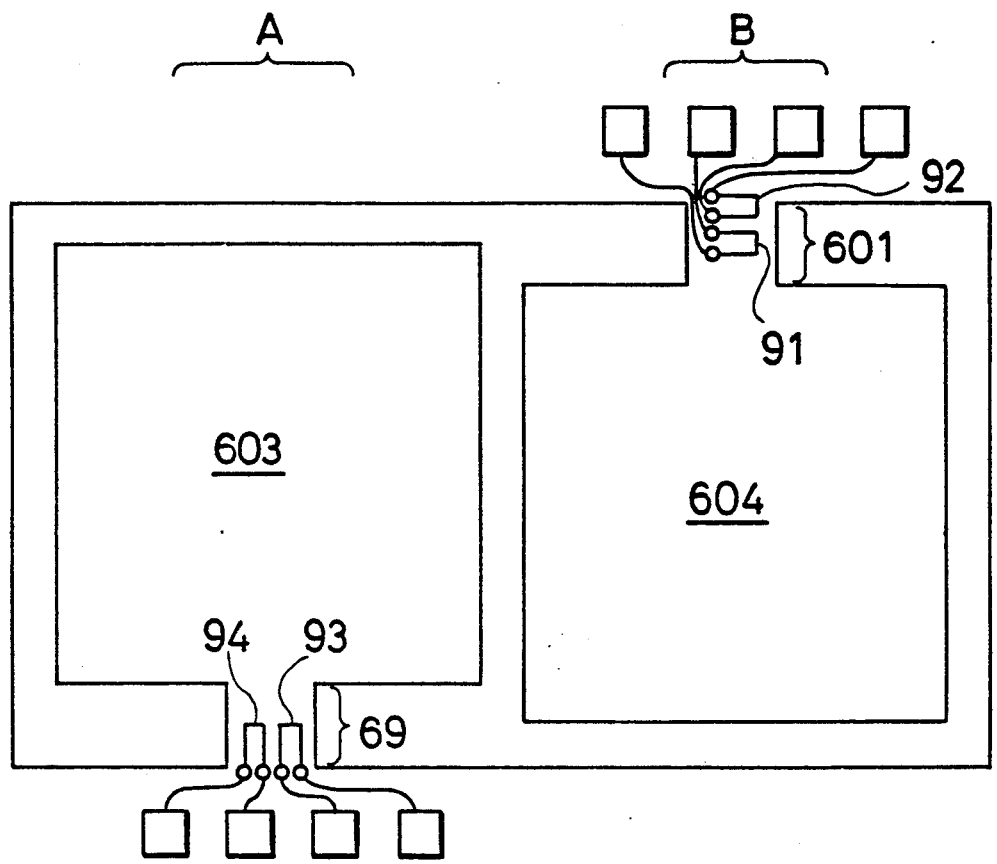
FIG. 11 is a top plan view of a second embodiment of a semiconductor acceleration sensor according to the present invention.

Referring now to FIG. 11, a second embodiment of a semiconductor acceleration sensor according to the present invention will be described in detail. Here, those elements which are equivalent to the corresponding elements in the first embodiment described above will be given the same reference numerals in the figures, and their descriptions are omitted.

This semiconductor acceleration sensor of the second embodiment shown in FIG. 11 has a configuration similar to that of FIG. 6 described above, except for the arrangement of the piezoresistors in the first and second sensor units A and B.

Namely, in this second embodiment, the piezoresistors 91 and 92 of the second sensor unit B are oriented in a direction perpendicular with respect to a direction in which the piezoresistors 93 and 94 of the first sensor unit A are oriented.

Figure 12:
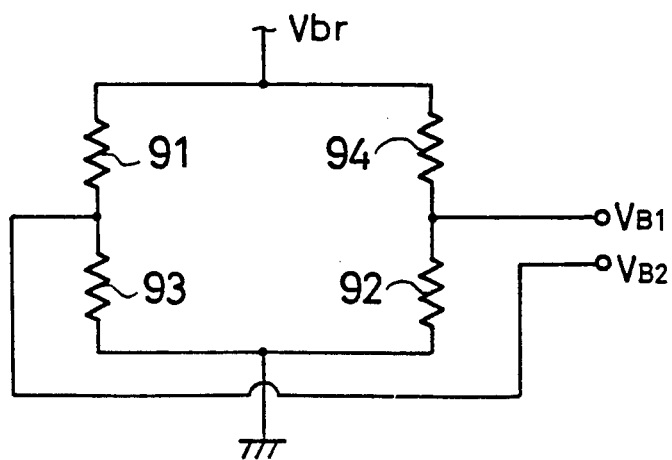
FIG. 12 is a diagram of an equivalent circuit for the semiconductor acceleration sensor of FIG. 11.

Moreover, in this second embodiment, the piezoresistors 91, 92, 93, and 94 are connected in the form of a full bridge circuit shown in FIG. 12.

With this configuration of FIG. 11, when a stress is produced in a particular direction, a resistance Rr perpendicular to this particular direction and a resistance Rs parallel to this particular direction will be changed by the same absolute value but with opposite signs.

Thus, in a case of having an acceleration applied in a normal detection direction Z, an overall output voltage given by:

$$V_{B1} - V_{B2} = (\Delta R/R) \times V_{br}$$

will be obtained.

On the other hand, in a case of having an acceleration applied in a non-detection direction X along the direction of the cantilever beams 69 and 601, the first weight portion 603 and the second weight portion 604 are displaced in the opposite direction with respect to the Z-axis, so that the piezoresistors 93 and 94 on the first cantilever beam 69 and the piezoresistors 91 and 92 on the second cantilever beam 601 receive the same stress in the mutually opposite directions simultaneously.

Here, however, because the piezoresistors 91 and 92 of the second sensor unit B are oriented in a direction perpendicular with respect to a direction in which the piezoresistors 93 and 94 of the first sensor unit A are oriented, the piezoresistance of all the piezoresistors 91, 92, 93, and 94 is either increased or decreased by the same amount, so that the overall output voltage of the bridge circuit will remain unchanged.

Thus, the cross axial sensitivity of the semiconductor acceleration sensor can also be reduced significantly by this second embodiment with a configuration of FIG. 11.

In addition, in this second embodiment, the piezoresistors are connected in a form of the full bridge circuit as shown in FIG. 12, so that the sensitivity in the normal detection direction Z can be twice as high as that of the first embodiment.

Here, it is pointed out that, when the full bridge circuit configuration is used in a conventional semiconductor acceleration sensor, it is impossible to remove the cross axial sensitivity of the semiconductor acceleration sensor completely because of the asymmetric arrangement of the piezoresistors. However, in this second embodiment, a significant reduction of the cross axial sensitivity of the semiconductor acceleration sensor becomes possible even when the full bridge circuit configuration is used, because of the ingenious configuration for the semiconductor acceleration sensor as a whole shown in FIG. 11.

Figure 13:
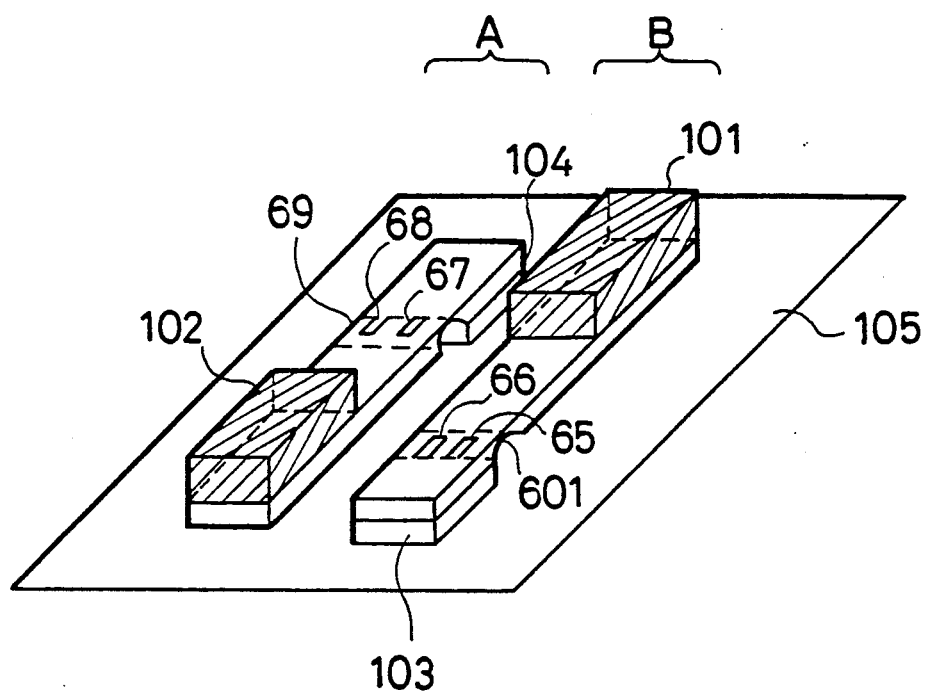
FIG. 13 is a perspective view of one possible variation of a semiconductor acceleration sensor according to the present invention.

Now, it is to be noted that, although both of the first and second embodiments described above use two sensor units formed monolithically on the same substrate, it is also possible to obtained the advantages of the present invention by arranging two separately manufactured acceleration sensors having an identical shape on the same plane in mutually opposite orientations, and by forming a bridge circuit by the piezoresistors of these two acceleration sensors, as shown in FIG. 13.

In a configuration shown in FIG. 13, the first cantilever beam 69 of the first acceleration sensor A and the second cantilever beam 601 of the second acceleration sensor B are mounted on bases 104 and 103 provided on a package substrate 105, respectively, and weights 102 and 101 are attached on free ends of the first cantilever beam 69 and the second cantilever beam 601, respectively.

Then, the piezoresistors 67 and 68 formed in a vicinity of a fixed end of the first cantilever beam 69 and the piezoresistors 65 and 66 formed in a vicinity of a fixed end of the second cantilever beam 601 are connected to form a half bridge circuit, just as in the first embodiment described above.

Alternatively, each of the first and second acceleration sensor A and B may be provided with a pair of the piezoresistors, where these piezoresistors are connected together in the form of a full bridge circuit, and the piezoresistors of the second acceleration sensor B are oriented in a direction perpendicular with respect to a direction in which the piezoresistors of the first sensor unit A are oriented, just as in the second embodiment described above.

In such a manner, by arranging two separately manufactured acceleration sensors having an identical shape on the same plane in mutually opposite orientations, and by forming a bridge circuit by the piezoresistors of these two acceleration sensors, the cross axial sensitivity of the semiconductor acceleration sensor can also be reduced significantly.

It is also to be noted that, apart from this, many modifications and variations of the above embodiments may be made without departing from the novel and advantageous features of the present invention. Accordingly, all such modifications and variations are intended to be included within the scope of the appended claims.

What is claimed is:

1. A semiconductor accelerator sensor, comprising:
   a frame;
   a first cantilever beam with its fixed end attached to the frame, having a first weight portion on its free end;
   first sensor means for detecting an acceleration, formed by piezoresistors provided in a vicinity of the fixed end of the first cantilever beam;
   a second cantilever beam with its fixed end attached to the frame, having a second weight portion on its free end, the second cantilever beam having an overall shape identical to that of the first cantilever beam, and oriented along a direction opposite to that along which the first cantilever beam is oriented; and
   second sensor means for detecting an acceleration, formed by piezoresistors provided in a vicinity of the fixed end of the second cantilever beam, the piezoresistors of the second sensor means being connected with the piezoresistors of the first sensor means to form a bridge circuit, wherein the piezoresistors of the second sensor means are arranged to be oriented along a direction perpendicular to the direction along which the piezoresistors of the first sensor means are arranged to be oriented.

2. The semiconductor acceleration sensor of claim 1, wherein the bridge circuit formed by the piezoresistors of the second sensor means and the piezoresistors of the first sensor means is a full bridge circuit.

3. The semiconductor acceleration sensor of claim 1, wherein each of the first cantilever beam and the second cantilever beam has a thickness significantly smaller than a width.

4. The semiconductor acceleration sensor of claim 1, wherein the frame, first cantilever beam, first sensor means, second cantilever beam, and second sensor means are formed monolithically on a single semiconductor substrate.

5. A semiconductor acceleration sensor, comprising:
   a package substrate having a first base and a second base;
   a first cantilever beam with its fixed end attached to the first base, having a first weight portion on its free end;
   first sensor means for detecting an acceleration, formed by piezoresistors provided in a vicinity of the fixed end of the first cantilever beam;
   a second cantilever beam with its fixed end attached to the second base, having a second weight portion on its free end, the second cantilever beam having an overall shape identical to that of the first cantilever beam, and oriented along a direction opposite to that along which the first cantilever beam is oriented; and
   second sensor means for detecting an acceleration, formed by piezoresistors provided in a vicinity of the fixed end of the second cantilever beam, the piezoresistors of the second sensor means being connected with the piezoresistors of the first sensor means to form a bridge circuit, wherein the piezoresistors of the second sensor means are arranged to be oriented along a direction perpendicular to the direction along which the piezoresistors of the first sensor means are arranged to be oriented.

6. The semiconductor acceleration sensor of claim 5, wherein the bridge circuit formed by the piezoresistors of the second sensor means and the piezoresistors of the first sensor means is a full bridge circuit.

7. The semiconductor acceleration sensor of claim 5, wherein each of the first cantilever beam and the second cantilever beam has a thickness significantly smaller than a width.

8. The semiconductor acceleration sensor of claim 5, wherein the first cantilever beam and the second cantilever beam are manufactured separately.

* * * * *